United States Patent [19]

Kokinopoulos

[11] 3,959,674
[45] May 25, 1976

[54] PULSE COUNTERS HAVING A MAGNETIC POLE WHEEL

[76] Inventor: Nicolas Kokinopoulos, Dimocritov 32, Athens 136, Greece

[22] Filed: Sept. 24, 1974

[21] Appl. No.: 508,805

[30] Foreign Application Priority Data

Sept. 28, 1973  Greece ............................... 49198
July 20, 1974  Greece ............................... 4877
Aug. 1, 1974  Greece ............................... 4942

[52] U.S. Cl. ........................... 310/49 R; 235/92 A; 317/140
[51] Int. Cl.² ...................................... H02K 37/00
[58] Field of Search ............... 317/140; 310/49 R; 235/92 A, 92 B, 92 G

[56] References Cited
UNITED STATES PATENTS

| | | | |
|---|---|---|---|
| 2,432,600 | 12/1947 | Werner et al. | 310/49 R |
| 2,795,710 | 6/1957 | Busche | 310/49 R |
| 3,626,263 | 12/1971 | McBride | 310/49 R |

Primary Examiner—R. N. Envall, Jr.
Attorney, Agent, or Firm—Larson, Taylor and Hinds

[57] ABSTRACT

The pulse counter device has a wheel with magnetic poles arranged regularly over its periphery. An element magnetisable by means of a coil is arranged to receive, at its terminals, signals representing pulses to be counted, these signals being adapted to take first and second values. The magnetisable element cooperates with the poles of the pole wheel so as to cause this wheel to rotate through a certain first angle, in a given direction, when the signal applied to the terminals of the coil passes from the first to the second value, means for rotating said wheel through a certain second angle, in the said given direction, when the signal at the terminals of the coil passes from the second to the first value. Registering means for the pulses to be counted, are driven by the pole wheel so as to indicate the advance by one unit when said wheel has rotated in the given direction. The means for rotating the wheel through the second predetermined angle comprises elastic return means adapted to cause said wheel to turn through the second predetermined angle, in said given direction, when the signal applied to terminals of said coil passes from the second to the first value, the second predetermined angle being substantially greater than the first. The elastic return means may be a polygonal cam turning against spring strips.

10 Claims, 12 Drawing Figures

PULSE COUNTERS HAVING A MAGNETIC POLE WHEEL

The invention relates to a pulse counter device. It relates more particularly, but not exclusively, to such counter devices which are intended to count, as a predetermined place such as an administrative center, the pulses representing units of telephone conversations.

In a known device of this type, such as that described, for example, in German Pat. No. 1,138,261, magnetic pole wheel is provided which cooperates with two elements each magnetisable by a coil. When a pulse is applied to the terminals of a coil, the pole of the wheel which is closest to the element associated with the coil thus energized is attracted by the latter; for this reason the wheel turns through a predetermined angle. When a pulse is applied to the terminals of the coil of the other magnetisable element, the pole wheel rotates, in the same direction, through the same predetermined angle. In addition, to avoid oscillations of the pole wheel, when the latter reaches a position fixed by the effect of a signal at the terminals of one or other of the coils, there is provided a particular configuration of the magnetic circuits associated with a pole wheel and with the magnetisable elements. In this known device, the pole wheel is intended to drive registering elements. Such a device has the drawback of requiring two magnetisable elements, which elements are relatively expensive and bulky. Moreover, the damping of the oscillations further complicates the construction of such a system.

It is an object of the invention to overcome the aforementioned drawbacks and especially to provide a pulse counter device which is simple and economic to construct.

It is another object to the invention to enable the production of such a counter device in which the risk of counting errors is distinctly reduced.

A further object of the invention is to provide a device of the type concerned whose energy consumption is low.

A counter device according to the invention comprises, as mentioned above, a wheel including magnetic poles arranged regularly over its periphery, an element magnetisable by means of a coil arranged to receive, at its terminals, signals representing pulses to be counted, these signals being adapted to take a first and a second value, said magnetisable elements cooperating with the pulse of said wheel so as to rotate this wheel through a first predetermined angle, in a given direction, when the signal applied to the terminals of the coil passes from the first to the second value, means for rotating said wheel by a second predetermined angle, is said given direction, when the signal at the terminals of the coil passes from the second to the first value, and means for registering the pulses to be counted, these registering means being driven by the pole wheel so as to indicate the advance by one unit when said wheel has rotated in the given direction. This device is characterised in that the means for rotating the wheel by a second predetermined angle comprise elastic return means adapted to rotate said wheel by the second predetermined angle, in the said given direction, when the signal applied to the terminals of said coil passes from the second to the first value, the second predetermined angle being substantially greater than the first.

Due to the fact that contrary to previously known devices, the first and the second predetermined angles are not equal, the elastic return means can be constituted by means different from a magnetic circuit or a permanent magnet. For the same reason the pole wheel can be formed in a simple shape which thereby facilitates manufacture. Finally, inequality between said predetermined angles ensures that the pole wheel turns always in the same direction (the given direction).

In a preferred embodiment of the invention, the elastic return means comprise a cam fast in rotation with the pole wheel and spring means adapted to cooperate with said cam so as, on the one hand, to store potential energy when the pole wheel rotates, in a given direction, through the first predetermined angle under the action of the passage of said signal from its first to its second value, and on the other hand, to restore this potential energy when said signal passes from the second to the first value in order to rotate the cam through the second predetermined angle.

It may be advantageous, in this preferred embodiment, to arrange the cam and the spring means so that, when said signal passes from its first to its second value, the spring means store their potential energy in the course of a period corresponding to a rotation of the pole wheel through an angle less than said first predetermined angle.

In a particular embodiment of the invention, the wheel has four poles and in this case said magnetisable element can be arranged so that it has two poles whose axis are substantially perpendicular, these forming the ends of a magnetic circuit adapted to be closed through said pole wheel.

In another embodiment, said magnetisable element has a single pole forming part of a magnetic circuit closed through the pole wheel and two walls surrounding said wheel, these walls being substantially perpendicular to the axis of rotation of this wheel. Preferably the registering means include assemblies of wheels or drums adapted to be driven by a driving element fast in rotation to the pole wheel. In this case the wheels or drums and the driving element are arranged so that the driving action of said assemblies takes place exclusively when the pole wheel rotates, in the given direction, through said first predetermined angle.

Advantageously in this case the driving element has, on its periphery, regularly distributed notches in equal number to the number of poles of said wheel, projections or teeth being provided at the level of the radial outer poles of each notch, these projections extending beyond one surface of said element in the direction parallel to its axis, said notches being adapted to cooperate with a wheel or drum of a first assembly of wheels or drums, the said wheel or drum having radial teeth of width less than the width of the notches of said driving element fast in rotation to the pole wheel. Preferably the projections of said driving element, which are neighbouring, but which occur at the level of the outer radial edges of different notches, are separated by an angle at the center greater to the angle at the center separating two projections occuring at the level of the same notch, the outer edge of said driving element being free of notches between said neighbouring projections, and said wheel or drum of the first assembly comprising, on one side a first number of first radial teeth distributed regularly over its periphery and on the other, a second number, of double value compared to the first, of second radial teeth distributed regularly, so that two first neighbouring radial teeth from a stop against the outer edge of the driving element when an attempt is made to rotate said wheel of the first assembly without the intervention of the driving element.

Other objects, advantages and characteristics of the invention will appear more clearly on reading the description of the preferred embodiments of the invention which follows, this description being given with reference to the accompanying drawings in which.

The examples, according to the invention, of the embodiment of the pulse counter device which will be described with relation to the figures refer to pulse counting representing the number of units of telephone conversations, for example of a subscriber. Such counter devices are installed in administrative centres called "telephone exchanges" and have the object of determining the sums which must be paid by a subscriber, these sums being of course a function of the number of telephonic units recorded.

In manner known in itself such a counter device comprises a wheel 1 with magnetic poles cooperating with a magnetic element energized by the pulses to be counted. For each pulse counted this wheel rotates through a given angle and drives, due to the fact of this rotation, through a given angle, two systems, respectively 2 and 3, with wheels or drums. In conventional manner, each drum of the system 3 represents either the units, or the tens, or the hundreds, etc . . . , FIGS. 0, 1 . . . 9 being written on the periphery of each drum.

In all the embodiments of the invention which have been shown, the magnetic pole wheel 1 is mounted on an axis or shaft 4 (FIG. 2, 5 and 8) on which a cam 5 is installed. This cam 5 cooperates with spring means 6. These spring means 6 cooperate with the cam 5 so as to store potential energy when a pulse to be counted energizes the magnetisable element; this potential energy is restored when the pulse no longer energizes and magnetisable element, so as to cause the cam 5 to rotate, and hence the wheel 1, through a given angle and always in the same direction of rotation, for example of the arrow F in the case of FIG. 1.

It will be noted from now on that such an assembly with a cam 5 and spring means 6 can be constructed in particularly simple manner. In addition, this system is advantageous since it fulfils a double function. The first function consists of avoiding the oscillations of the wheel 1 when the latter arrives close to an equilibrium position. However in the embodiment which will be described below with relation to FIGS. 5 and 6 the oscillations do not interfer with the counting. The second function consists of actuating the advance of said wheel 1 when a pulse to be counted is no longer applied to the control terminals of the counter device.

There will now be described, with relation to FIGS. 1 to 4, a first embodiment of the counter device according to the invention.

Figure 1:
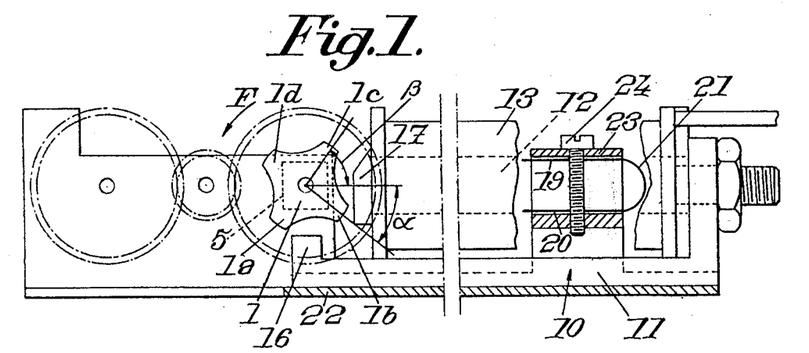
FIG. 1 shows, partly in section and with a portion removed, a side view of one embodiment of a counter device according to the invention.
Figure 2:
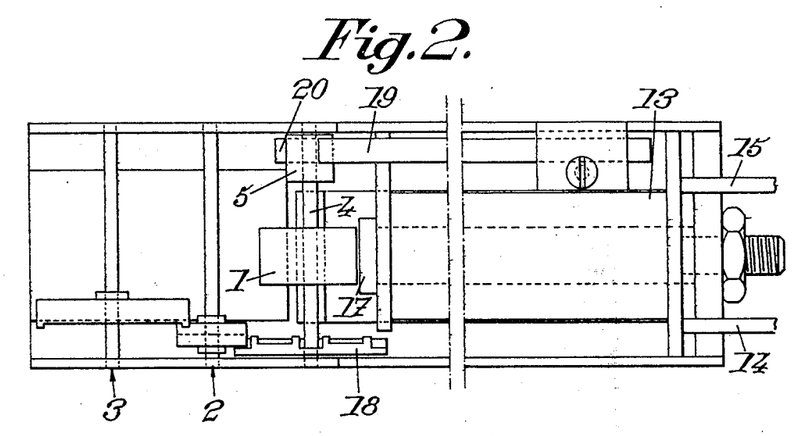
FIG. 2 illustrates a partial top view of the embodiment shown in FIG. 1.

As will be seen in FIGS. 1 and 2, this device comprises a magnetic circuit 10 comprising two parallel arms 11 and 12 which are normally horizontal. Around a portion of this magnetic circuit, here around the upper arm 12, is arranged the energizing winding 13 of said magnetic circuit. This winding of the coil is intended to receive the pulses to be counted. These pulses are, in the example shown in FIGS. 1 and 2, applied to the pins 14 and 15.

The end of the arm 11 of the circuit 10 is extended by a vertical pole 16 ending in a horizontal section, whilst the end of the arm 12 terminates by a horizontal pole 17 whose end section is vertical. The meeting point (imaginary) of the axis of the poles 16 and 17 occurs on the axis of the shaft 4. The wheel 1 is arranged at the level of these poles 16 and 17.

The wheel 1 has four magnetic poles 1a, 1b, 1c and 1d distributed regularly at the periphery of the wheel 1. In other words the center angle between two neighbouring poles is 90°.

It is important to note that, contrary to previously known pole wheels, the space separating two consecutive poles has the shape of a concave and not convex circular arc. Moreover these circular arcs end at the level of the ends of the poles 1a, 1b, 1c, or 1d. Thus, the construction of a wheel 1 such as shown in FIG. 1 is particularly simple.

It will be noted in addition, again as regards the wheel 1, that its number of poles is no longer equal to ten or to a sub-multiple of ten.

In addition to the wheel 1 and the cam 5, the shaft 4 supports a driving wheel or driving element 18 intended to drive the assemblies 2 and 3 of wheels or drums, as will be explained below with relation to FIGS. 5 and 6.

The cam 5 has a contour having the shape of a square and the spring means 6 includes two spring strips 19 and 20 of unequal length. The free end 19a of the upper strip 19 occurs on a first side with respect to the axis of the shaft 4, whilst the free end 20a of the lower strip 20 occurs at the second side with respect to the axis of the shaft 4. In the example, these spring strips 19 and 20 form part of the same strip; as is shown in FIG. 1, the other ends of these stips are connected to one another through a curved portion 21.

To terminate with the description of the device shown in FIGS. 1 and 2, it will be noted that the magnetic circuit 10 is formed from a single part and is arranged on a frame 22 formed of a non magnetic material. This frame 22 also contains the other elements of the device according to the invention. Finally the strips 19 and 20 are held at their end neighbouring the curved portion 21 by a hollow sleeve 23 and a screw 24.

Figure 3:
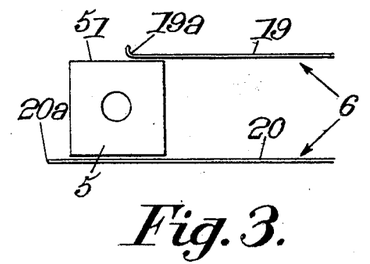
FIGS. 3 and 4 show two positions of the cam and of the strip spring, according to the invention, of the device shown in FIGS. 1 and 2.

The operation of the portion of the counter device which has just been described with respect to FIGS. 1 to 4 will be explained below with more particular reference to FIGS. 3 and 4.

In inactive state, that is to say when no current is applied to the terminals of the coil 13, one of the poles of the wheel 1, here pole 1b, form an angle $\alpha$ of predetermined value with the horizontal, this angle $\alpha$ being substantially less than 45°. In the exemple, $\alpha$ has a value of 36°. As a result the axis of the pole 1a is separated by the same angle $\alpha$ with respect to the vertical. In addition the axis of the pole 1c forms, with the horizontal, an angle $\beta = 90° - \alpha$, substantially greater than 45° (54° in the example). Under these conditions the pole 1b is substantially closer to pole 17 than the pole 1c. This pole 1b is however more distance from the pole 16 then the pole 1a.

The angular position of the wheel 1 in inactive state remains constant (this position is determined at more or less 90°) since this position is fixed by the respective positions of the cam 5 and the spring strips 19 and 20. In fact, in inactive position, the strips 19 and 20 bear against two parallel opposite sides of said cam 5. It is the elasticity of the spring strips 19 and 20 which holds said parallel opposite sides of the cam 5 in a predetermined direction, the horizontal direction in the example.

When a pulse to be counted is applied to the terminals of the coil 13, the pole 1b of the wheel 1 is attracted by the pole 17, whilst the pole 1a of said wheel 1 is attracted by the pole 16 of the magnetic circuit 10. In fact the signal applied to the terminals of the coil 13 induces a magnetic field in the magnetic circuit 10, the latter being closed through the wheel 1; the wheel 1 rotates so as to reduce the air-gaps between its poles and the poles 16 and 17. As a result it is the poles of the wheel 1 which are closest to the respective poles 16 and 17 of the circuit 10 which are attracted by the latter poles. This results from the value of the angle $\alpha$ which is substantially less than that of the angle $\beta$. As long as a signal is applied to the terminals of the winding 13, the axis of the pole 1b remains horizontal and the axis of the pole 1a remains vertical. In order that this arrangement may be possible, it is of course necessary that the intensity of the electric current passing through the turns of the winding 13 should have a sufficient value to overcome the opposing resistance in the direction of the arrow F, by the spring strips 19 and 20 — to the rotation of the shaft 4.

Figure 4:
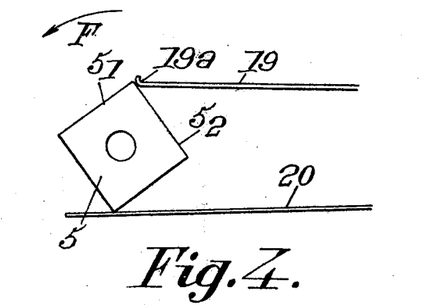

The positions of the cam 5 and of the strips 19 and 20, when a current passes through the turns of the coil 13, is shown in FIG. 4. It is seen in this figure that the cam 5a, like the wheel 1, rotates through 36°, in the direction of the arrow F, with respect to its inactive position shown in FIG. 3. The sizes and the position of the strip 19 are such that, in the inactive position, this strip 19 is flat against a face $5_1$ of the periphery of the cam 5, whilst in the working position (shown in FIG. 4) this strip 19 does not rest on a face of the periphery of the cam 5; in the latter case, the end 19a bears on a face $5_2$ adjacent to face $5_1$. In the working position, the strip 19 is deflected upwardly from its normal position, its end 19a hence exerting a force directed downwardly on the face $5_2$ of the cam 5. Under these conditions this strip 19 has a tendency to cause said cam 5 to rotate — and hence the wheel 1 which is associated with it through the shaft 4 — in the direction of the arrow F. As indicated above, it is necessary that the intensity of the electric current passing through the windings of the coil 13 should be sufficient for this force exerted by the strip 19 to be less than the magnetic attracting forces of the poles 16 and 17 on the poles of the wheel 1.

When the signal applied to the terminals of the coil 13 is eliminated — that is to say after the disappearance of the pulse to be counted — the magnetic attracting forces are nil or negligible with respect to the force exerted by the spring strip 19. Under these conditions this strip 19 causes the cam 5 to rotate in the direction of the arrow F until the face $5_2$ is applied against the strip 19, that is to say until the cam 5 is restored to an inactive position. At this moment the pole 1a takes the position of the pole 1b and the pole 1b takes the position of the pole 1c (the first inactive position is shown in FIG. 1).

It will now be described, with respect to FIGS. 5 and 6, an embodiment of the registering means comprising the assemblies 2 and 3 of wheels or drums, as well as the manner in which the driving wheel 18 drives these assemblies 2 and 3.

Figure 5:
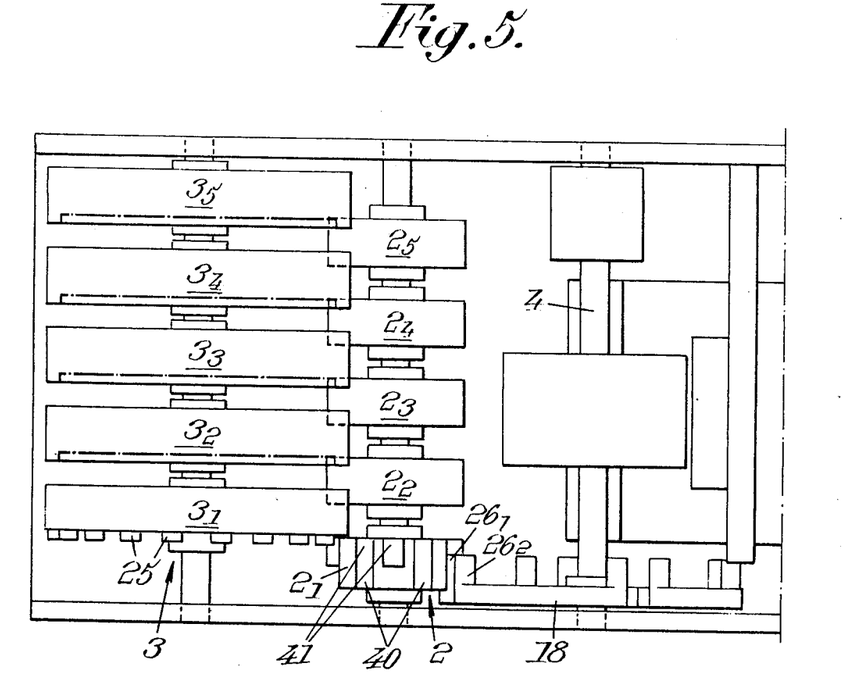
FIG. 5 shows an embodiment, according to the invention, of registration means of a counter device according to the invention.

As is seen in FIG. 5, the assembly 3 includes five drums $3_1$, $3_2$, $3_3$, and $3_5$. In the same way the assembly 2 has five wheels $2_1$, $2_2$, $2_3$, $2_4$ and $2_5$. All the wheels 3 are identical with each other and, in the same way, all of the wheels 2 are identical with each other.

Figure 6:
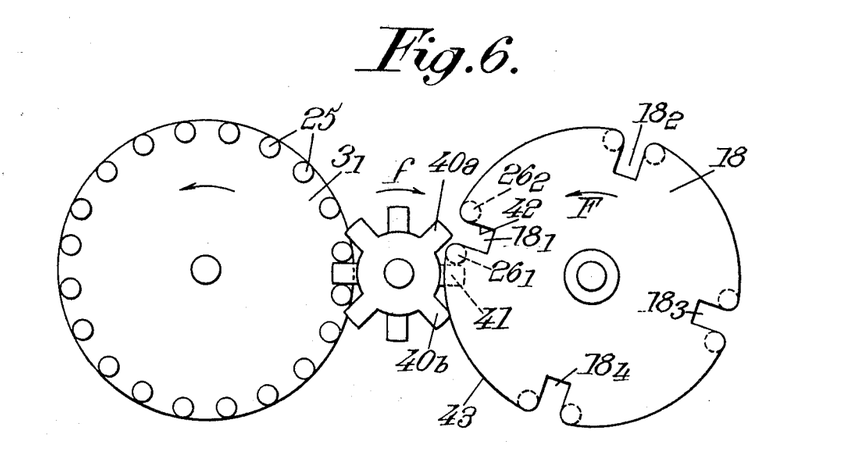
FIG. 6 is a side view of the registering means shown in FIG. 5.

In a manner known in itself, each wheel of the system 3, for example the wheel $3_1$ as shown in FIG. 6, comprises on its front face, twenty teeth, such as the tooth 25, distributed regularly and, on its rear face, an indentation (not shown).

Each wheel of the system 2, such as the wheel $2_1$, comprises, towards the front, four radial teeth 40 distributed regularly and, towards the rear, eight radial teeth 41 distributed regularly. In the exemple half of the teeth 41 are in axial extension of the teeth 40. At the periphery of the drum 18 are four indentations or notches $18_1$, $18_2$, $18_3$ and $18_4$. At the outer radial ends of each of these indentations or notches are arranged teeth such as teeth $26_1$ and $26_2$ of the identation $18_1$. The teeth 26 are directly rearwardly and are intended to cooperate with the teeth of the wheel $2_1$. With respect to the axis of the shaft 4, the angular separation between the middle positions of the teeth $26_1$ and $26_2$, associated with the same indentation, is 18°. Finally in the example the diameter of the wheel 18 is equal to that of the wheels of the system 3 and this diameter is 2.5 times greater than that of the wheels of the assembly 2. Of course the diameters of the wheels 18 and $3_1$ could be different.

As regards the driving of the assembly 3 by the wheel 18, it will firstly be noted that the position shown in FIG. 6 corresponds to the inactive position, that is to say when no current is applied to the terminals of the coil 13. In this inactive position, the tooth $26_1$ is in contact with a rear tooth 41. When a pulse is applied to the terminals of the coil 13, the wheel 18 rotates in the direction of the arrow F through an angle of 36°. In the course of half of this rotation through an angle of 36°, that is to say during a rotation through an angle of 18°, the wheel 18 drives the wheel $2_1$ in the direction of the arrow F by the action of the tooth $26_1$ on a rear tooth 41 of the wheel $2_1$; this action of the tooth $26_1$ is terminated when said tooth 41 occurs outside the indentation $18_1$. In the course of the other half of this rotation of 36° the wheel 18 drives the wheel $2_1$, still in the direction of the arrow F, by the action of one edge 42 of the indentation $18_1$ on a front tooth 40. Thus a rotation of the wheel 18 (and hence of the pole wheel) through an angle of 36°, and corresponding to the advance from an inactive position (no signal at the terminals of the coil 13) to a working position (a signal at the terminals of the coil), enables the wheel $2_1$ to be rotated through an angle of 90°.

As a result the wheel $3_1$ has rotated, in the direction of the arrow F through an angle corresponding to two teeth, that is to say 36°. This value corresponds to 1/10 of a revolution of the wheel $3_1$ and hence to one unit on this wheel.

When the energizing signal is no longer applied to the terminals of the coil 13, the wheel 18 resumes its inactive position, by rotating still in the direction of the arrow F. It is important to note, that with this embodiment of the wheel 18, when this wheel 18 rotates through an angle of 54° — from working position to inactive position — it is not in engagement with the teeth of the wheel $2_1$ and the rotation of the shaft 4 is hence not impeded by resistance of the systems 2 and 3. In other words the wheel 18 drives the systems 2 and 3 only on the course of its first period of rotation (36°); thus, as already mentioned an oscillation of the shaft 4 around its working position would not be troublesome since it would not modify the count recorded on the drums of the system 3. Finally it will be noted that the shape of the wheel 18 and its position with respect to the wheel $2_1$ prevent the rotation of the wheels of the systems 2 and 3 by manual intervention. Only the rotation of the wheel 18 under the effect of a pulse at the terminals of the coil 13 hence permits the advance in count of the registering means. In fact if an attempt is made to rotate the wheels of the system 2 or of the system 3 directly one or other of the front teeth 40a or 40b comes into abutment against the outer edge 43 of the wheel 18 and these wheels of the system 2 or of the system 3 are hence blocked in rotation by this abutment effect.

There will now be described, with respect to FIGS. 7, 8 and 9, another embodiment of the magnetic circuit 10 of the wheel 1 and of the cam system 5 and spring means 6.

Firstly as regards the magnetic circuit, the essential difference from that shown in FIG. 1 is that the lower arm 11a (FIG. 7) forms an integral part of the frame 22a. The structure of the device is thus simplified.

In the embodiment shown in FIG. 1, the poles of the wheel 1 have a symmetrical shape.

Figures 7, 8:
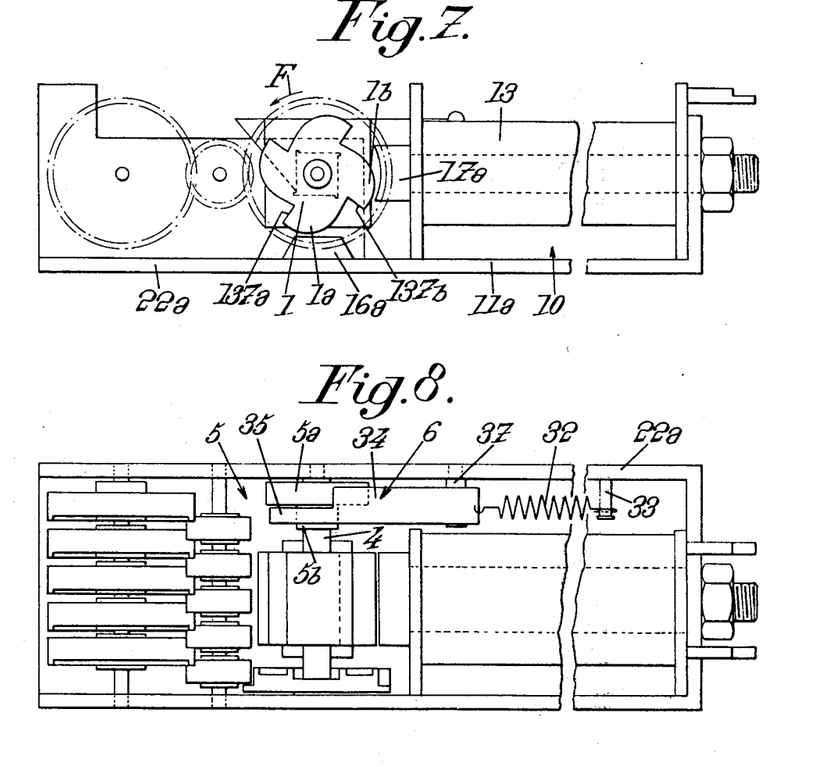
FIG. 7 shows in diagrammatic manner a side view of a first modification of an embodiment of a pole wheel and magnetisable elements of a device according to the invention.
FIG. 8 is a partial top view of the device shown in FIG. 7.

In the embodiment shown in FIG. 7, the pole 17a has a symmetrical shape. However, the teeth of the wheel 1 have a dissymmetrical shape.

Another difference between the embodiments shown in FIGS. 1 and 7 resides in the cam 5 and the spring means 6.

Figures 9, 10:
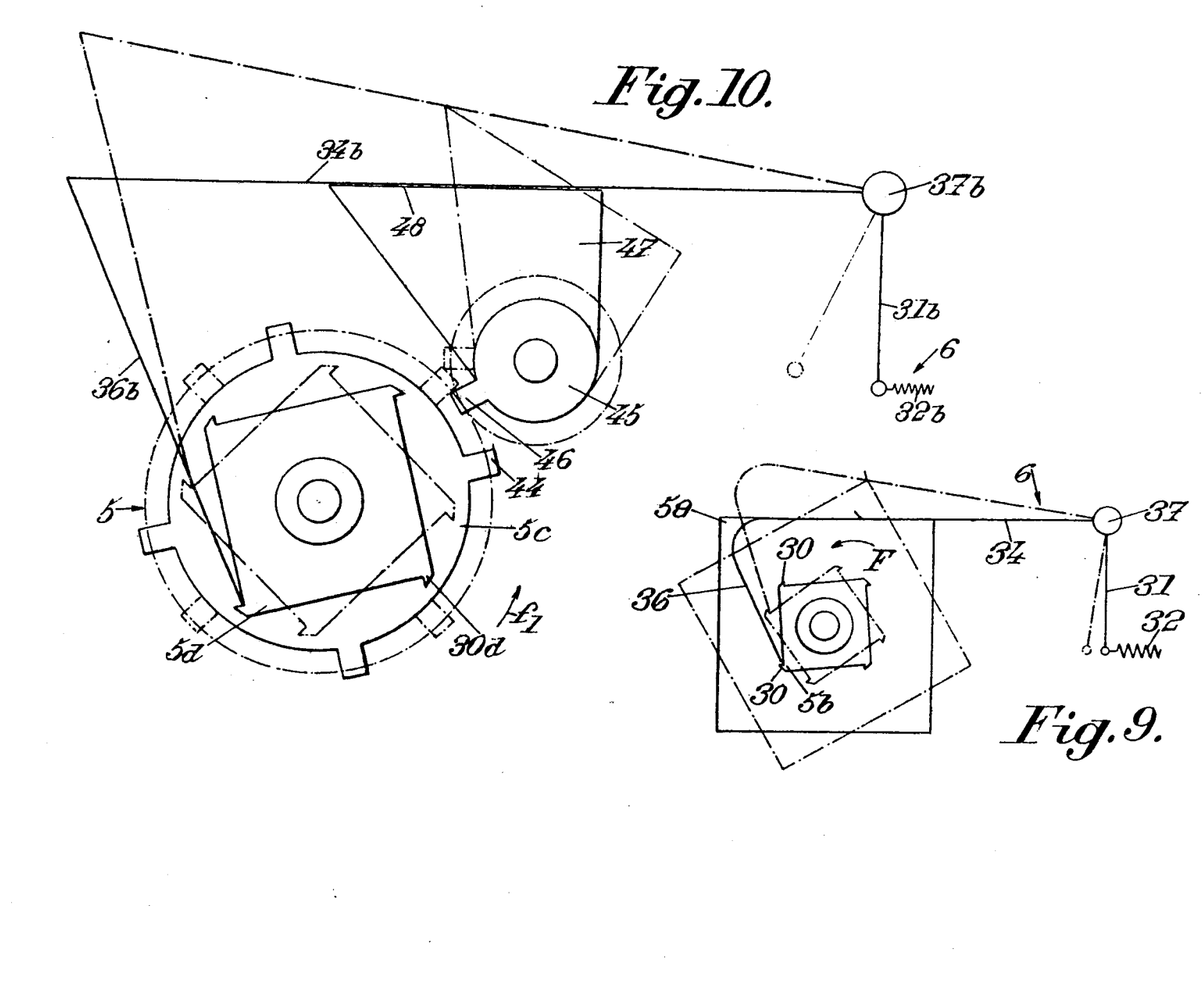
FIG. 9 illustrates, according to the invention, elastic return means usable for example for the embodiment of the device shown in FIG. 8.
FIG. 10 shows a modification of the elastic return means according to the invention.

In the embodiment shown in FIGS. 7, 8 and 9, the cam 5, which is fast to the shaft 4, comprises two parts 5a and 5b fast to one another. These two parts of the cam, 5a and 5b, have both the outer shape of a square; however, the side of the square formed by the part 5b is less than the side of the square formed by the part 5a. This arrangement is clearly seen in FIGS. 8 and 9. As for the cam 5 shown in FIG. 1, the meeting point of the diagonals of each of the parts 5a and 5b coincide substantially with the axis of the shaft 4. The outer sides of the part 5b are not exactly parallel to the corresponding sides of the part 5a but form an angle of several degrees with the latter. Finally a tooth 30 (FIG. 9) extends outwardly from each corner of the square formed by the part 5b of the cam 5.

As shown in FIGS. 8 and 9, the spring means 6 comprise a strip with two arms 31 and 34 and a spring 32. The arm 31 is normally vertical and is connected to a fixed part of the frame 22a through the spring 32. This spring 32 is hooked, through one of its ends, to a pin 33 fast to the frame 22a and its other end is connected to the lower portion of the vertical strip 31.

The horizontal arm 34 stops above the portion 5a, before the axis of the shaft 4. Above the part 5b, this arm 34 is extended into a strip 35 which, at its end, is curved so as to form an oblique part 36 (FIG. 9) whose end is normally housed against a tooth 30 which then forms a stop. An axle 37 is provided in the vicinity of the junction between the arms 31 and 34, so that the strip can pivot around this axle.

In operation, when no signal is applied to the terminals of the coil 13, the arm 34 bears upon the upper edge of the part 5a of the cam 5. In this way, and under the effect of the spring 32, this upper part is held substantially horizontal. Under these conditions, as shown in FIG. 7, the poles of the wheel 1 are not opposite the corresponding poles 16a and 17a. More precisely, the radial edge 137a of the pole 1a is displaced by 36° with respect to the vertical and the radial edge 137a of the pole 1b is displaced by the same angle with respect to the horizontal. When a current is applied to the terminals of the coil 13, the poles of the wheel 1 are attracted, as in the case of FIG. 1, so that the air-gaps between the poles of the wheel and those (16a and 17a) of the circuit 10 are minimum.

Thus the wheel 1 undergoes a rotation of about 36° in the direction of the arrow F. This working position is shown in mixed lines in FIG. 9 (for the cam 5 and the strip). Under these conditions, the arm 34 is tilted upward and the spring 32 is tensioned. This spring 32 exerts a resilient strength which tends to bring the arm 34 towards the horizontal position. When the electric current flows no more through the windings of the coil 13 this spring 32 enables to bring back the following upper edge of the part 5a of cam 5 in the horizontal position under the conjugate effect of the arm 34 and of the force exerted by the end of the oblique part 36 on the projection formed by the tooth 30 of the part 5b.

This rotation is also effected in the direction of the arrow F. As in the case of FIG. 1, the strip (with the spring 32) and the cam 5 exert a double action: on the one hand, to avoid oscillations when the wheel 1 arrives close to its working position and, on the other hand, to effect return to an inactive position, thereby always rotating in the same direction, when the signal is eliminated at the terminals of the coil 13.

As it has been illustrated in FIG. 10 yet another modification of the system comprising cam 5, the strip 6 and a spring.

In this modification the cam 5 also includes two integral parts 5c and 5d. The part 5d has the same shape than the part 5b in the embodiments shown in FIG. 9, namely the shape of a square with teeth 30d at its corners. On the contrary the part 5c is circular and includes four teeth arranged at 90° over its periphery. In other words these teeth are arranged at the ends of two diameters. These two diameters are each parallel to a respective side of the square formed by the cam 5d.

In the vicinity of the cam 5 is arranged a wheel 45 pivotable around an axis parallel to that of the shaft 4. This wheel 45 includes a single tooth 46. This wheel 45 is extended upwardly by a part 47 including an upper surface 48 on which a strip 34b normally rests. In fact in this embodiment of the invention the spring means are of substantially simpler construction. In this case these means include an elongated strip 34b and a spring 32b; the strip 34b normally has the substantially horizontal position and ends in a side through an oblique strip 36b whose end bear against the projections formed by the teeth 30d. The other side of the strip 34b is extended by a strip 31b which is normally substantially vertical and which is, as in the case of FIG. 9, fast to the spring 32b of which one end is fixed to the frame of the device.

In inactive position, shown in solid line, the strip 34b rests on the face 48 of the part 47. In this case the tooth 46 is spaced by a certain angle from the closest tooth 44 on the periphery of the part 5c of the cam 5.

When a current passes through the turns of the coil 13, the cam 5 is rotated in the direction of the arrow $f_1$. At the beginning of its travel the cam 5 (and hence the wheel 1) does not encounter resistance since the tooth 44 of the part 5a does not yet come into contact with the tooth 46 of the wheel 45. It is only at the end of its travel that the tooth 44 enters into contact with the tooth 46, thus causing a part 47 to tilt and hence lifting the strip 34b, as shown in mixed lines in the FIG. 10. The spring 32b is then tensioned. When the signal at the terminals of the coil 13 disappears, the effect of the spring 32 enables the part 47 to be brought back, and hence the tooth 46, into the position shown in solid line. At the same time the end of the strip 36b bears against the projection formed by a tooth 39 and hence causes rotation of the cam 5 to advance in the same direction, indicated by the arrow $f_1$.

The advantage of this arrangement shown in FIG. 10 is that no resistance is applied to the rotation of the cam 5, and hence to that of the wheel 1, in the course of a part of its travel when a signal is applied to the terminals of the energizing coil. This absence of resistance could be used, for example to trigger contacts (not shown).

As a modification, in place of the pivoting strip 34b, 31b and of the spring 32b there can be used a curved spring strip (of the same shape as the arms 34b and 36b) fixed at a predetermined point, corresponding to the position of the axle 37b.

Figures 11, 12:
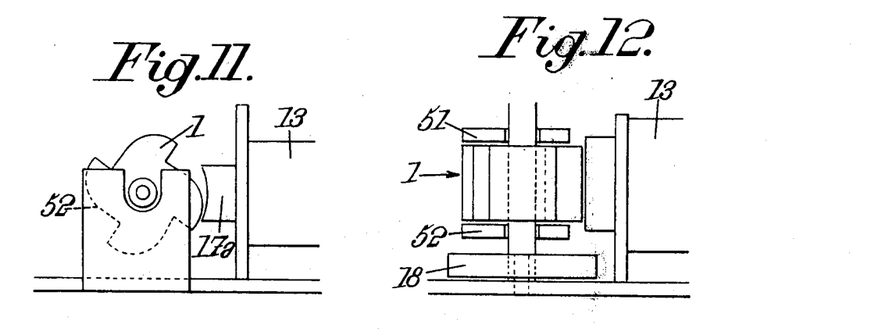
FIG. 11 shows another embodiment, according to the invention, of the pole wheel and of the magnetisable element of a device according to the invention.
FIG. 12 shows a top view of the embodiment shown in FIG. 9.

Finally FIGS. 11 and 12, show a modification of the embodiment of the magnetic circuit 10.

In this embodiment the pole 16 is eliminated, the pole 17 being maintained. In the example shown in these FIGS. 11 and 12, the wheel 1 has the same shape as in the exemple shown in FIG. 7. In the same way the pole 17a has the same shape as that shown in FIG. 7. The magnetic circuit is closed, here, by means of two plates 51 and 52 formed of a magnetic material and occuring on each side of the wheel 1. The magnetic flux hence enters radially into the wheel 1 and engages parallel to the axis of the shaft 4 through the plates 51 and 52. This embodiment enables the intensity of the current which has to pass through the turns of the coil 13 to be further reduced.

The counting device which has just been described with regard to the figures can lend itself to numerous modifications without departing, for this reason, from the scope of the invention. Thus, as regards the wheel 1, it will be mentioned that the number of poles can be different from four; it suffices that it be at least equal to two. It will also be noted that the displacement of the pivoting strips or of the spring strips can be used to trigger contacts, said strips being able to form an integral part of these contacts.

The advantages, already mentioned, of the device according to the invention are the following : reduced bulk, simplicity of manufacture and negligible risks of counting errors. Moreover, the arrangement described with regard to the figures of the cam, the spring means, the pole wheel and the wheel 18 enables modification of previously known counters with reduced expense.

The device according to the invention can be used each time that it is described to count pulses.

As itself evident and as emerges already from the foregoing, the invention is a no illimited to those of its types of application and embodiment which have been more especially envisaged; it encompasses, on the contrary, all modifications.

I claim:

1. Pulse counter device comprising a wheel having magnetic poles arranged in regular intervals around the periphery thereof, an element magnetizable by means of a coil arranged to receive, at its terminals, signals representing pulses to be counted, these signals taking first and second values, said magnetizable element cooperating with the poles of said wheel so as to cause said wheel to rotate through a first predetermined angle, in a given direction, when the signal applied to the terminals of the coil passes from the first to the second value, means for rotating said wheel through a second predetermined angle, in the said given direction, when the signal at the terminals of the coil passes from the second to the first valve, and registering means for the pulses to be counted, said registering means being driven by the pole wheel so as to indicate an advance by one unit when said wheel has rotated in the given direction, the means for rotating the wheel through said second predetermined angle comprising elastic return means for causing said wheel to turn through the second predetermined angle, in said given direction, when the signal applied to terminals of said coil passes from the second to the first value, the second predetermined angle being substantially greater than the first, the elastic return means comprising a cam secured to said pole wheel for rotation therewith and spring means for cooperating with said cam so as to, on one hand, store potential energy when the pole wheel rotates, in the given direction, through the first predetermined angle under the effect of the passage of said signal from its first value to its second value, and to, on the other hand, restore this potential energy when said signal passes from the second value to the first value in order to rotate the cam through the second predetermined angle, the contour of said cam having substantially the shape of regular polygon whose number of sides is equal to the number of poles of said wheel and the spring means comprising a spring strip, said spring strip resting on one side of the regular polygonal shape cam when the said signal has the first value, and the free end of said strip passing from one side of the regular polygonal shaped cam to another side of said cam when the signal at the terminals of the coil passes from the first to the second value.

2. Device according to claim 1, wherein said cam comprises first and second parts secured to one another, both parts having a contour in the shape of a regular polygon with the same number of sides, equal to that of the poles of the wheel, and the spring means include first and second strips secured to one another, the first strip cooperating with the first part of the cam so as to rest on one side of this cam when the signal at the terminals of the coil has the first value, the second part of the cam comprising a stop disposed in the neighbourhood of each apex of the regular polygon, and the second strip having a free end curved so as to cooperate with the stops of the second part of the cam so as to rotate the latter when the first strip does not rest on a side of the first part of the cam.

3. Device according to claim 2, wherein the spring means comprises a coil spring secured to at least one strip and said strips are adapted to pivot around an axis of rotation, said coil spring being tensioned when the pole wheel has rotated through said first predetermined angle under the effect of the passage of said signal from its first to its second value.

4. Pulse counter device comprising a wheel having magnetic poles arranged at regular intervals about the periphery thereof, an element magnetizable by means of a coil arranged to receive, at its terminals, signals representing pulses to be counted, these signals taking first and second values, said magnetizable element cooperating with the poles of said wheel so as to cause said wheel to rotate through a first predetermined angle, in a given direction, when the signal applied to the terminals of the coil passes from the first to the second value, means for rotating said wheel through a second predetermined angle, in the said given direction, when the signal at the terminals of the coil passes from the second to the first value, and registering means for the pulses to be counted, said registering means being driven by the pole wheel so as to indicate an advance by one unit when said wheel has rotated in the given direction, the means for rotating the wheel through said second predetermined angle comprising elastic return means for causing said wheel to turn through the second predetermined angle, in said given direction, when the signal applied to terminals of said coil passes from the second to the first value, the second predetermined angle being substantially greater than the first, the elastic return means comprising a first cam secured to said pole wheel for rotation threrwith and spring means for cooperating with said cam so as to, on one hand, store potential energy when the pole wheel rotates, in the given direction, through the first predetermined angle under the effect of the passage of said signal from its first to its second value, and to, on the other hand, restore this potential energy when said signal passes from the second to the first value in order to rotate the cam through the second predetermined angle, said cam and the spring means being arranged so that, when said signal passes from its first to its second value, the spring means stores potential energy in the course of a period corresponding to a rotation of the pole wheel through an angle less than said first predetermined angle, said cam comprising first and second parts secure to one another, and the elastic return means further comprising a second cam, the first part of the first cam having a circular contour with teeth regularly spaced and equal in number to that of the poles of the wheel, the second part of the first cam having a contour in the shape of a regular polygon whose number of sides is equal to that of the poles of the wheel, projections being provided in the vicinity of each apex of the contour of said first part, the second cam having first and second parts secured to one another, the first part of the second cam including, at least in part, a circular contour with a tooth intended to cooperate with the teeth of the first part of the first cam, the second part of the second cam having a contour having a rectilinear surface, said spring means comprising a strip having a rectilinear part adapted to rest on the rectilinear surface of the second part of the second cam when said signal has the first value and a curved part whose end is in contact against a projection of the first part of the first cam when the signal passes from the second to the first value.

5. Pulse counter device comprising a wheel having magnetic poles arranged at regular intervals around the periphery thereof, an element magnetizable by means of a coil arranged to receive, at its terminals, signal representing pulses to be counted, these signals taking first and second values, said magnetizable element cooperating with the poles of said wheel so as to cause said wheel to rotate through a first predetermined angle, in a given direction, when the signal applied to the terminals of the coil passes from the first to the second value, means for rotating said wheel through a second predetermined angle, in the said given direction, when the signal at the terminals of the coil passes from the second to the first value, and registering means for the pulses to be counted, said registering means being driven by the pole wheel so as to indicate an advance by one unit when said wheel has rotated in the given direction, the means for rotating the wheel through said second predetermined angle comprising elastic return means for causing said wheel to turn through the second predetermined angle, in said given direction, when the signal applied to terminals of said coil passes from the second to the first value the second predetermined angle being substantially greater than the first, registering means comprising a plurality of assemblies of rotatable elements adapted to be driven by a drive member secured to the pole wheel for rotation therewith, said rotatable elements and said drive member being arranged so that the driving action of said assemblies takes place solely when the pole wheel rotates, in the given direction, through said first predetermined angle.

6. Device according to claim 5, wherein said drive member and the pole wheel are affixed to the same shaft.

7. Device according to claim 5, wherein said drive member comprises, on the periphery thereof, regularly distributed notches equal in number to the number of poles of said wheel, projections being provided on said drive member at the level of the radial outer edges of each notch, these projections extending from one surface of said drive member in the direction parallel to its axis, said notches being adapted to cooperate with a rotatable element of a first assembly of rotatable elements, said latter rotatable element comprising radial teeth of width less than the width of the notches of said drive member.

8. Device according to claim 1, wherein the projections of said drive member, which are neighbouring, but which occur at the level of the outer radial edges of different notches, are separated by an angle at the center greater than the angle at the center separating two projections occuring at the level of the same notch, the outer edge of said drive member being free to notches between said neighbouring projections, said rotatable element of the first assembly comprising, on one side, a first number of first radial teeth regularly distributed over its periphery and, on the other side, a second number, which is twice the first, of regularly distributed radial teeth, so that two first neighbouring radial teeth abut against the outer edge of the drive when rotation of said rotatable element of the first assembly is attempted without the intervention of the drive member.

9. Device according to claim 5, comprising two assemblies of rotatable elements, the rotatable elements being all identical in each of these assemblies.

10. Device according to claim 1, wherein each pole of said wheel has a contour not including an axis of radial symmetry, said magnetizable element comprising a pole having an axis or plane of symmetry.

* * * * *